United States Patent [19]

Kobayashi et al.

[11] Patent Number: 4,853,721
[45] Date of Patent: Aug. 1, 1989

[54] AUTOMATIC FILM INFORMATION READING METHOD AND DEVICE

[75] Inventors: Haruo Kobayashi; Akira Yoshizaki, both of Osaka; Takeo Hoda, Kawachinagano; Masataka Kashima, Toyokawa, all of Japan

[73] Assignee: Minolta Camera Kabushiki Kaisha, Osaka, Japan

[21] Appl. No.: 137,078

[22] Filed: Dec. 23, 1987

[30] Foreign Application Priority Data

Dec. 24, 1986 [JP] Japan ................. 61-310593
Dec. 24, 1986 [JP] Japan ................. 61-310592

[51] Int. Cl.⁴ ............................................. G03B 7/00
[52] U.S. Cl. ............................................. 354/21
[58] Field of Search ............................... 354/21

[56] References Cited

U.S. PATENT DOCUMENTS

| 3,667,363 | 6/1972 | Tamalsa ................... 354/21 |
| 4,024,557 | 5/1977 | Aovama et al. ........... 354/21 X |
| 4,074,286 | 2/1978 | Suzuki ..................... 354/21 |
| 4,103,308 | 7/1978 | Sakurada et al. ......... 354/458 |
| 4,200,371 | 4/1980 | Suzuki et al. ............. 354/21 |
| 4,431,283 | 2/1984 | Hoda et al. ............... 354/21 |
| 4,582,408 | 4/1986 | Miki et al. ................ 354/21 |
| 4,586,800 | 5/1986 | Tominaga et al. ........ 354/21 |
| 4,588,272 | 5/1986 | Hoda et al. ............... 354/21 |
| 4,621,914 | 11/1986 | Taniguchi et al. ....... 354/21 |
| 4,676,616 | 6/1987 | Hoda et al. ............... 354/21 |

FOREIGN PATENT DOCUMENTS 57-85053   5/1982  Japan.
60-225121 11/1985  Japan.
61-107329  5/1986  Japan.

Primary Examiner—Michael L. Gellner
Attorney, Agent, or Firm—Burns, Doane, Swecker & Mathis

[57] ABSTRACT

A film information reading system for automatically reading film information such as film sensitivity from code patterns on a film cartridge mounted in a cartridge chamber of a camera. The code patterns comprise a six code areas arranged axially of the film cartridge. The reading system comprises a first electric contact to contact at least one of the second to fourth code areas, a second electric contact to contact the fifth code area, and a third electric contact to contact the sixth code area. The second and third contacts are in a short-circulating relationship. A film information readout circuit is connected to the contacts for reading the film information from conductive, and non-conductive states between the first to third contacts provided by the code patterns.

15 Claims, 7 Drawing Sheets

Fig. 1

FILM SENSITIVITY

| ISO | SV | \multicolumn{6}{c}{CODE AREA} | | | | | |
|-----|----|----|----|----|----|----|----|
|     |    | E1 | E2 | E3 | E4 | E5 | E6 |
| 25   | 3  | ▓ |   |   |   | ▓ |   |
| 32   |    | ▓ |   |   |   |   | ▓ |
| 40   |    |   | ▓ |   |   | ▓ |   |
| 50   | 4  | ▓ | ▓ |   |   | ▓ |   |
| 64   |    |   | ▓ |   |   |   | ▓ |
| 80   |    | ▓ | ▓ |   |   |   | ▓ |
| 100  | 5  | ▓ |   | ▓ |   | ▓ |   |
| 125  |    | ▓ |   | ▓ |   |   | ▓ |
| 160  |    |   | ▓ | ▓ |   | ▓ |   |
| 200  | 6  | ▓ | ▓ | ▓ |   | ▓ |   |
| 250  |    |   | ▓ | ▓ |   |   | ▓ |
| 320  |    | ▓ | ▓ | ▓ |   |   | ▓ |
| 400  | 7  | ▓ |   |   | ▓ | ▓ |   |
| 500  |    | ▓ |   |   | ▓ |   | ▓ |
| 640  |    |   | ▓ |   | ▓ | ▓ |   |
| 800  | 8  | ▓ | ▓ |   | ▓ | ▓ |   |
| 1000 |    |   | ▓ |   | ▓ |   | ▓ |
| 1250 |    | ▓ | ▓ |   | ▓ |   | ▓ |
| 1600 | 9  | ▓ |   | ▓ | ▓ | ▓ |   |
| 2000 |    | ▓ |   | ▓ | ▓ |   | ▓ |
| 2500 |    |   | ▓ | ▓ | ▓ | ▓ |   |
| 3200 | 10 | ▓ | ▓ | ▓ | ▓ | ▓ |   |
| 4000 |    |   | ▓ | ▓ | ▓ |   | ▓ |
| 5000 |    | ▓ | ▓ | ▓ | ▓ |   | ▓ |

AUTOMATIC FILM INFORMATION READING METHOD AND DEVICE

BACKGROUND OF THE INVENTION

1. Field of the Invention

The present invention relates to a system for automatically reading film information, particularly film sensitivity, provided on a film cartridge in what is called the DX system. The DX system has been developed to enable film information such as film sensitivity and the number of frames in be automatically set to a camera when the film cartridge is loaded into a cartridge chamber.

2. Description of the Prior Art

The film cartridge used in this system, as will be described in detail later, comprises a peripheral wall including film information code patterns into which the film information is encoded by arranging conductive areas and non-conductive areas according to patterns corresponding to the film information. The cartridge chamber includes a plurality of electric contacts arranged therein for contacting the film information patterns. When the film cartridge is loaded into the cartridge chamber, the film information such as film sensitivity is read through conductive and non-conductive states between the electric contacts provided by the film information code patterns. These code patterns, called CAS code patterns, are standardized. The film information code patterns representing film sensitivity are arranged as shown in FIG. 1.

Notations "E1" to "E6" in FIG. 1 indicate positions of code areas as counted from an end of the film cartridge from which a film winding shaft projects. Thus, the code area referenced "E1" is hereinafter called a first code area, the code area referenced "E2" a second code area and so on. The hatched portions represent conductive areas, and the blank portions represent non-conductive areas. "SV" represents film sensitivity (speed value) according to the APEX system.

It is old in the art to read film information by detecting conduction and non-conduction between the first code area and the other code areas. To meet the needs for compact cameras, however, it may be necessary to dispose a different mechanism in a position which otherwise provides a space to accommodate an electric contact for contacting the first code area. Then this contact loses its accommodating space.

The Japanese patent publication Kokai No. 61-107329, for example, discloses a system for automatically reading film sensitivity from film information code patterns without using the first code area. This system comprises two electric contacts for contacting each of the code areas except the first code area. One of the electric contacts is positive, and the other is grounded, namely negative. This pair of contacts is contactable with the same code area, whereby the film sensitivity is read on the basis of conductive and non-conductive states thereof.

According to this publication, as shown in FIG. 1, a line of demarcation for the fourth code area is drawn between ISO 320 and ISO 400, to allocate conductive areas for ISO 320 and below and non-conductive areas for ISO 400 and above. Furthermore, films of ISO 100 sensitivity and ISO 400 sensitivity are in wide use and other films are seldom used. Accordingly, a simple improvement is proposed to provide a pair of electric contacts only for the fourth code area for detecting the sensitivity to be ISO 400 in the event of conduction between the two contacts and ISO 100 when no conduction occurs therebetween.

The above technique of detecting sensitivity on the basis of conduction and non-conduction between the pair of electric contacts for contacting the same code area requires no electric contact for the first code area, thus allowing the space for accommodating the electric contacts to be reduced axially of the film winding shaft. This technique, therefore, has an advantage over the older technique which, for example, includes a reference electric contact for contacting the first code area which is constantly conductive regardless of film sensitivity. With this technique, the sensitivity is detected on the basis of conduction and non-conduction between the reference contact and other contacts which contact the other code areas. In particular, the proposed improvement mentioned above requires only a space corresponding to a width of the fourth code area axially of the film winding shaft.

However, the technique of detecting sensitivity on the basis of conduction and non-conduction between one pair of electric contacts for contacting one code area has the following drawback:

It is necessary to provide a sufficient space between two electric contacts forming a pair in order to avoid detection errors due to a direct contact therebetween. This is achieved by arranging the two electric contacts so that they are contactable with the corresponding code area adjacent opposite ends thereof instead of positions adjacent its center. It is then necessary to fix the contacts to appropriate positions with high precision in order to avoid detection errors due to a displacement of the film cartridge causing the electric contacts to contact a code area next to the code area for which the contacts are intended. This not only lowers the efficiency of assembly work, but is prone to cause the electric contacts to contact a next code area as a result of a film cartridge displacement even if the electric contacts are fixed with high precision.

Accordingly, a system has been desired which is capable of reading film information without necessitating one pair of contacts for each code area even where, for some reason, a contact cannot be provided for the first code area.

the following examples represent the type of film information reading system noted in the outset hereof, and in particular, represent the type of mechanism surrounding the electric contacts.

One such example is disclosed in U.S. Pat. No. 4,582,408. This mechanism comprises a base plate disposed peripherally of a cartridge chamber to be movable radially of the cartridge chamber, and pins supported by the base plate to be movable radially of the cartridge chamber. The pins project inwardly of the cartridge chamber to have proximal ends contactable with a peripheral wall of a film cartridge loaded in the cartridge chamber. Springs are also provided to urge the base plate and pins inwardly of the cartridge chamber. The distal ends of the pins define electric contacts.

Another such example is disclosed in Japanese Patent Publication Kokai No. 60-225121. In this example, segments formed of a resilient material are arranged peripherally of a cartridge chamber to be movable radially of the cartridge chamber. The segments have free distal ends projecting into the cartridge chamber for contacting a peripheral wall of a film cartridge loaded in the cartridge chamber. The free ends of the segments define electric contacts.

In the former case, three components, i.e. the pin, base plate and spring, are required to provide an electric contact. Furthermore, this mechanism requires means for holding the pin against disengagement from the base plate toward the inside of the cartridge chamber and for holding the base plate against disengagement in the same direction from a camera body. In addition, the spring must be placed in a narrow space between the pin/base plate and the camera body. These requirements result in a complicated overall construction and a low efficiency of assembly work.

The latter example has the advantage of constructional simplicity and higher assembling efficiency since the electric contacts are provided merely by attaching the segments. The free ends of the segments are movable to retracted positions by being pushed radially of the cartridge chamber. However, these free ends do not oscillate to the retracted positions when pushed axially of the film winding shaft. This results in the following inconvenience.

Generally, the winding shaft of the film cartridge is fitted onto a rewinding shaft of a camera when loading the film cartridge into the cartridge chamber. Thus, the loading of the film cartridge involves a movement thereof axially along the direction of the winding shaft. In the course of loading the film cartridge into the cartridge chamber, therefore, one end corner of the film cartridge slides axially along the peripheral wall of the cartridge chamber and tends to contact the projecting free ends of the segments. In this prior construction, the free ends of the segments do not retract radially outwardly of the cartridge chamber when the corner of the film cartridge pushes the free ends axially along the direction of the winding shaft. As a result, the corner of the film cartridge becomes caught by the free ends of the segments to obstruct the film cartridge loading.

SUMMARY OF THE INVENTION

The object of the present invention is to eliminate the drawbacks of the prior art and provide an automatic film information reading system of simple construction and excellent operability for automatically reading film information, particularly film sensitivity, from film information code patterns on a peripheral surface of a film cartridge. The film sensitivity is encoded by arranging conductive areas and non-conductive areas axially of the film cartridge to correspond to film information.

According to the invention there is provided an automatic film information reading method comprising the steps of causing a first electric contact to contact at least one of a second, a third and a fourth code areas counted from an end of the film cartridge from which a film winding shaft projects, causing a second electric contact to contact a fifth code area, causing a third electric contact in a short-circuiting relationship with the second electric contact to contact a sixth code area, detecting conduction and non-conduction states between the first to third electric contacts provided by the film information code patterns, and determining the film sensitivity from detection results.

Further, according to the invention there is provided an automatic film information reading device comprising a cartridge chamber for accommodating the film cartridge, probe means for contacting the film information code patterns, the probe means including a first electric contact for contacting at least one of a second, a third and a fourth code areas counted from an end of the film cartridge from which a film winding shaft projects, a second electric contact for contacting a fifth code area, a third electric contact in a short-circuiting relationship with the second electric contact for contacting a sixth code area, and short-circuit means for electrically short-circuiting the second and third electric contacts, and a film information readout circuit connected to the probe means for reading the film sensitivity from conduction and non-conduction states between the first to third electric contacts provided by the film information code patterns.

As shown in FIG. 1, at least one of the fifth and sixth code areas is conductive regardless of the film sensitivity. Accordingly, the film information reading system of the present invention includes second and third electric contacts short-circuited to each other to be equivalent with the electric contact in the prior art for contacting the first code area. Whether the code area contacted by the first contact is conductive or non-conductive is known from conduction or non-conduction between the first contact and the second/third contacts. Therefore, by providing the first contact for contacting the fourth code area, for example, the conductive state is indicative of ISO 400 and the non-conductive state ISO 100 (errors for the ranges of ISO 25 to 320 and ISO 400 to 1600 do not exceed 2 EV, respectively, and this is coverable by the film latitude). In addition, another first contact may be provided for the third code area. Then, for example, conduction only between the first contact for the third code area and the second/third contacts is indicative of ISO 100, conduction only between the first contact for the fourth code area and the second/third contacts is indicative of ISO 400, and the combination of the two conductive states is indicative of ISO 1600. In this manner film sensitivity may be detected from the conductive and non-conductive states.

Moreover, one electric contact is provided for each code area since, as described above, film sensitivity is detected on the basis of conduction and non-conduction between the first contact which contacts contacting at least one of the second to fourth code areas and the second/third contacts; that is, between the electric contacts which contact different code areas. Consequently, the present invention has no difficulty in permitting the electric contacts to contact the code areas at central positions thereof.

Thus, the system according to the present invention does not require an electric contact for the first code area, which leaves a good allowance of space for accommodating the electric contacts for the other code areas. As a result, the electric contacts may be easily mounted in positions to be contactable with the corresponding code areas. Even when the film cartridge is slightly displaced, the electric contacts are prevented from contacting code areas next to the code areas for which the contacts are intended, thus assuring a reliable detection.

According to a further development of the present invention, the probe means includes a plurality of segments formed of a resilient material. Each segment is fixed at an end thereof, with the other free end being disposed adjacent the rewinding shaft and movable radially of the cartridge chamber. The free end projects into the cartridge chamber to contact the peripheral surface of the film cartridge mounted in the cartridge chamber, the electric contacts being formed on the free ends.

In the above construction, the free end of each segment defining the electric contact is disposed adjacent the rewinding shaft. Therefore, when, in the course of loading a film cartridge, a corner of the film cartridge contacts the segment axially along the direction of the film winding shaft, the segment oscillates radially outwardly of cartridge chamber and allows the the corner film cartridge to slide axially of the along the segment toward the rewinding shaft. This construction is effective to avoid the corner of the film cartridge becoming caught by the segment.

Thus the present invention provides an automatic film information reading system having a simple construction and is easy to assemble. The invention also eliminates the obstruction to the film cartridge loading presented heretofore by the film information reading mechanism, to permit the film cartridge to be loaded easily and smoothly.

Further features and advantages of the present invention will become apparent from the following detailed description of embodiments of the invention to be taken in conjunction with the accompanying drawings.

BRIEF DESCRIPTION OF THE DRAWINGS

FIG. 1 is a table showing film information code patterns arranged on a film cartridge with conductive and non-conductive areas to correspond to film information.

DESCRIPTION OF THE PREFERRED EMBODIMENTS

An embodiment of the present invention will be described next.

Figure 2:
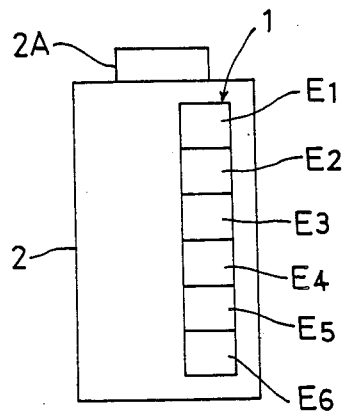
FIG. 2 is a side view of the film cartridge.

Referring to FIG. 2, a film information code section 1 is formed on a peripheral surface of a film cartridge 2. A camera comprises a film sensitivity reading device for automatically reading film sensitivity from the film information code section 1 when the film cartridge 2 is loaded into a cartridge chamber 3.

The film information code section 1 includes six code areas E1–E6 arranged axially of the cartridge 2. These code areas E1–E6 provide film sensitivity information encoded with conductive areas and non-conductive areas arranged in patterns corresponding to the film sensitivity as shown in FIG. 1.

The film cartridge 2 has a shaft projecting from an end thereof as 2A. To facilitate distinction among the six code areas E1–E6, they are termed herein a first code area E1, a second code area E2 and so on in the order counted from the code area nearest to the projecting end 2A.

In FIG. 1, the hatched portions represent the conductive areas, and the blank portions represent the non-conductive areas. "SV" represents film sensitivity values (speed value) according to the APEX system.

Figure 3:
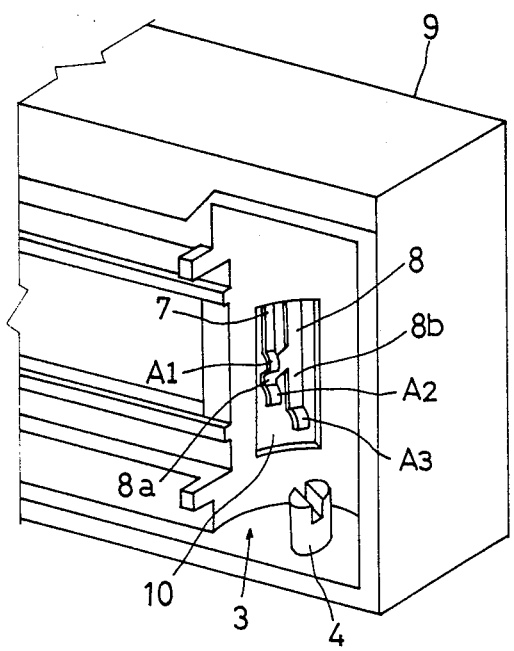
FIG. 3 is a perspective view of a principal portion of a camera including an automatic film sensitivity reading device embodying the present invention.
Figure 4:
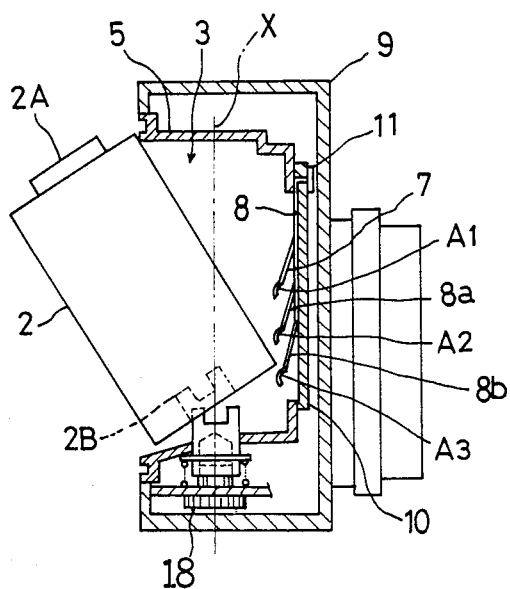
FIG. 4 is a view of a vertical section of the camera showing the film cartridge in the course of loading into a cartridge chamber.
Figure 5:
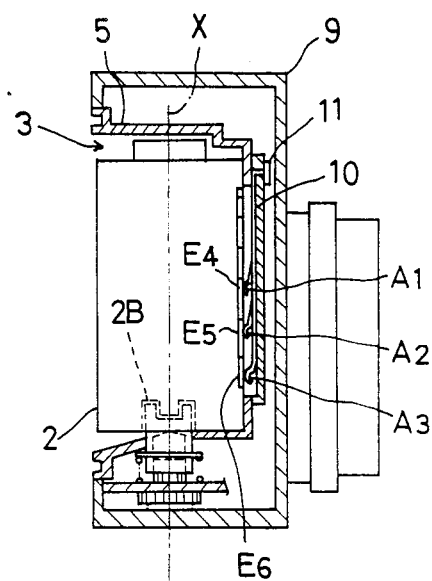
FIG. 5 is a view of a vertical section of the camera showing the film cartridge loaded in the cartridge chamber.

As shown in FIGS. 3 through 5, the cartridge chamber 3 has a rewinding fork 4 in a lower position thereof. This rewinding fork 4 extends through a portion of a camera body 5 defining a bottom of the cartridge chamber 3, to be slidable axially of the shaft of the film cartridge 2. When the film cartridge 2 is loaded into the cartridge chamber 3, the rewinding fork 4 enters and engages a non-projecting end 2B of the shaft of the film cartridge 2 to hold the latter against rotation. The rewinding fork 4 is biased by a spring to a position projecting into the cartridge chamber 3 for entry to the non-projecting end 2B of the shaft.

Numeral 18 indicates a drive gear for driving the rewinding fork 4. The drive gear 18 is in engagement with the rewinding fork 4 through ridges and grooves to allow sliding movements of the rewinding fork 4.

The film information reading device includes a first electric contact A1 for contacting the fourth code area E4 of the film information code section 1, a second electric contact A2 for contacting the fifth code area E5, and a third electric contact A3 for contacting the sixth code area E6. The second and third contacts A2 and A3 are short-circuited to each other through short-circuiting means. The film information reading device further includes a film information readout circuit 6 as shown in FIG. 6, for reading the film sensitivity information through conductive and non-conductive states between the second and third contacts A2 and A3 and the first contact A1.

As shown in FIGS. 3 through 5, the first contact A1 consists of a free end of a segment 7 formed of a resilient conductive material and fixed at the other end thereof. The second contact A2 consists of one leg 8a at a bifurcated free end of a segment 8 formed of the resilient conductive material and fixed at the other end thereof. The third contact A3 consists of the other leg 8b at the bifurcated free end of the segment 8. Thus, the second and third contacts A2 and A3 are short-circuited to each other through the bifurcate segment 8, and this segment 8 acts as the short-circuiting means. The two segments 7 and 8 project into the cartridge chamber 3 with the free ends thereof contacting the peripheral surface of the film cartridge 2 loaded in the cartridge chamber 3. The segments 7 and 8 are movable radially of the cartridge chamber 3, and are arranged side by side in the peripheral direction to extend along an axis X of the shaft of the film cartridge 2, with the free ends directed toward the rewinding fork 4. Further, the segments 7 and 8 are attached at the other or base ends to a back face, opposed to an outer covering 9, of a portion of the camera body 5 defining a peripheral wall of the cartridge chamber 3. The camera body 5 defines an opening for allowing the free ends of the two segments 7 and 8 to extend into the cartridge chamber 3. A light-shielding plate 10 is attached to the camera body 5 to close the opening from behind the segments 7 and 8. The base ends of the segments 7 and 8 are directly connected to a circuit board 11. In other words, the segments 7 and 8 act as conductors between the contacts A1, A2 and A3 and the circuit board 11.

The second code area of the film information code section 1 has a weight corresponding to 1 EV, the third code area has a weight corresponding to 2 EV, the fourth code area has a weight corresponding to 4 EV, the fifth code area has a weight corresponding to $\frac{1}{3}$ EV, and the sixth code area has a weight corresponding to $\frac{2}{3}$ EV when the weights are measured in terms of EV value according to the APEX system. The film information readout circuit 6 for reading the film sensitivity information has the following specific construction.

Figure 6:
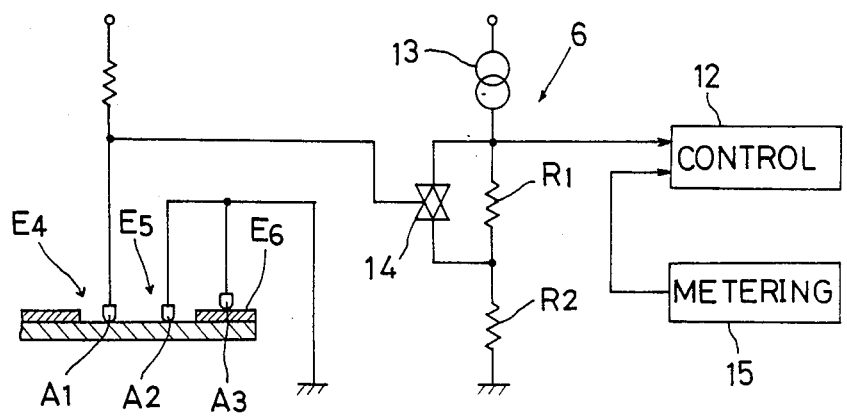
FIG. 6 is a circuit diagram.

As shown in FIG. 6, the circuit 6 includes two resistors R1 and R2 connected in series to a constant current source 13 for applying a sensitivity information voltage to an exposure control circuit 12 of the camera. One of the resistors R1 is connected parallel to an analog switch 14 which is turned off by conduction between the first contact A1 and the second or third contacts A2 and A3, and is turned on by non-conduction therebetween. When the analog switch 14 is turned off, a voltage corresponding to 7 SV according to the APEX system (or ISO 400) is output through the two resistors R1 and R2. When the analog switch 14 is turned on, the analog switch 14 causes a short-circuit between opposite ends of one of the resistors R1 whereby a voltage corresponding to 5 SV (or ISO 100) is output through only the other resistor R2. Numeral 15 indicates a metering circuit.

Accordingly, when an ISO 100 film cartridge 2 is loaded, the fifth code area E5 becomes conductive with the fourth code area E4 remaining non-conductive. As a result, no conduction occurs between the first contact A1 and the second and third contacts A2 and A3, whereby the output voltage corresponds to ISO 100 and the film cartridge 2 is automatically detected to be ISO 100. When an ISO 400 film cartridge 2 is loaded, the fourth and fifth code areas E4 and E5 both become conductive and a conduction occurs between the first contact A1 and the second A2. The output voltage now corresponds to ISO 400 and the film cartridge 2 is automatically detected as such.

As will be understood from the foregoing description, the film sensitivity code patterns are formed by suitably superposing non-conductive layers over conductive layers.

In the described embodiment, the electric contacts, particularly the second and third contacts A2 and A3 corresponding to the fifth and sixth code areas E5 and E6, are located adjacent the rewinding fork 4 as seen axially of the shaft of the film cartridge 2. Therefore, when the film cartridge 2 is loaded into the cartridge chamber 3 as shown in FIG. 4, the corner between the peripheral wall and the bottom of film cartridge 2 tends to contact the segment 8 defining the electric contacts A2 and A3. The segment 8, however, is movable by such contact radially outwardly of the cartridge chamber 3 against its own spring load. Thus, as the film cartridge 2 is moved toward the rewinding fork 4, the corner of the film cartridge 2 will cause the segments 7 and 8 to oscillate smoothly without hooking them.

Figure 7:
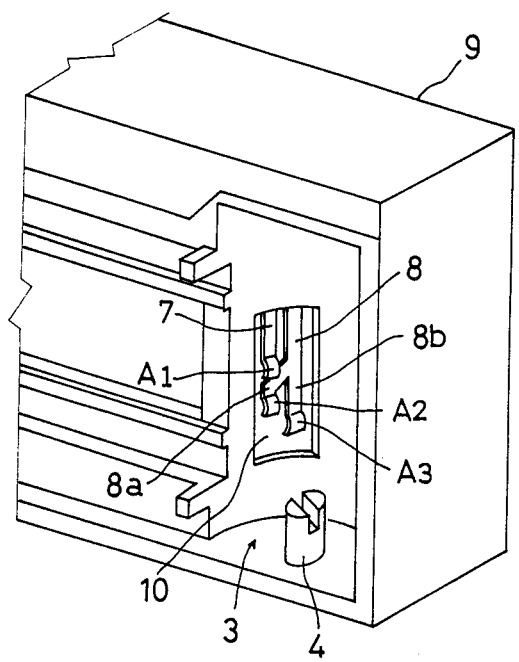
FIG. 7 is a perspective view of a principal portion of a camera according to another embodiment of the invention.
Figure 8:
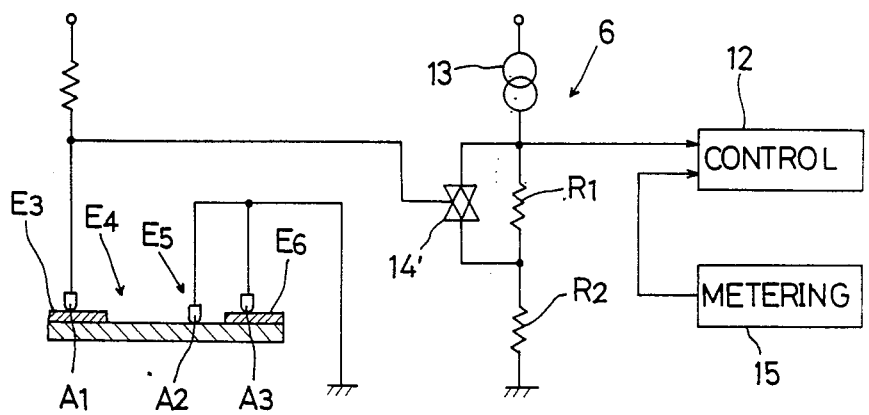
FIG. 8 is a diagram of a circuit included in the camera shown in FIG. 7.

FIGS. 7 and 8 show a modified construction which differs from the foregoing embodiment only in that the first contact A1 is disposed to contact the third code area E3 instead of the fourth code area E4. It will be understood by referring to FIG. 1 that this construction is able to automatically detect the film sensitivity as in the foregoing embodiment by providing an analog switch 14' which is turned on by conduction between the first contact A1 and the second and third contacts A2 and A3 and is turned off by non-conduction therebetween.

In the described embodiment, the second and third contacts A2 and A3 are defined by the two legs 8a and 8b at the bifurcated end of segment 8 whereby the two contacts A2 and A3 are short-circuited to each other. Alternatively, the two contacts A2 and A3 may be defined by separate segments, wherein the contacts A2 and A3 are short-circuited to each other at an intermediate position between the segments and the film information readout circuit 6.

Figure 9:
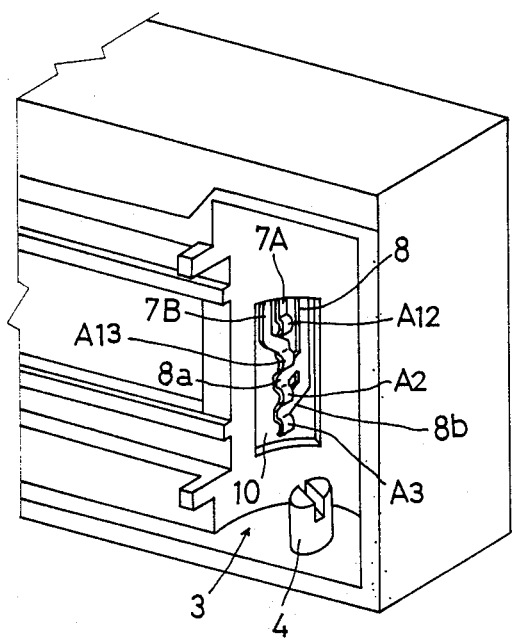
FIG. 9 is a perspective view of a principal portion of a camera according to a further embodiment of the invention.
Figure 10:
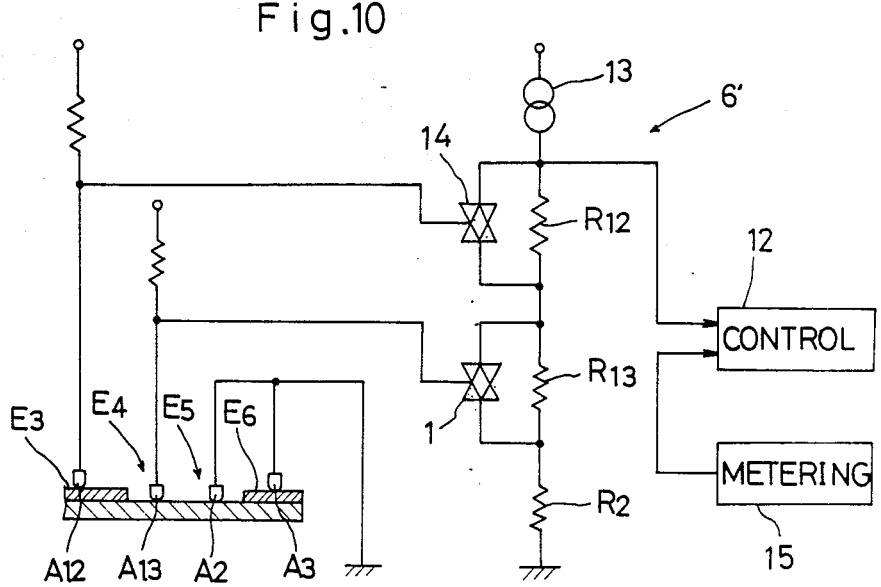
FIG. 10 is a diagram of a circuit included in the camera shown in FIG. 9.

FIGS. 9 and 10 show an automatic film information reading device according to another embodiment of the invention. This device differs from the two preceding embodiments in that the first electric contact A1 for contacting the third or fourth code area is replaced by two separate contacts. These contacts consist of a contact A12 for contacting the third code area E3 and a contact A13 for contacting the fourth code area E4. The contacts A12 and A13 are defined, as in the preceding embodiments, by free ends of segments 7A and 7B formed of the conductive spring material and supported at the other ends, respectively. The second and third contacts A2 and A3 are the same as in the preceding embodiments.

This embodiment comprises a film information readout circuit 6' which is basically the same as in the preceding embodiments. As shown in FIG. 10, this circuit 6, however, includes a parallel combination of an analog switch 14 and a resistor connected to each of the contacts A12 and A13. Resistor R12 is provided for the contact A12, and resistor R13 for the contact A13.

The following four-way judgment may be available by appropriately selecting a resistance value for each resistor. The film sensitivity is judged ISO 64 when the third code area E3 and fourth code area E4 are both non-conductive, ISO 100 when only the third code area E3 is conductive, ISO 400 when only the fourth code area E4 is conductive, and ISO 1,600 when the third code area E3 and fourth code area E4 are both conductive.

Figure 11:
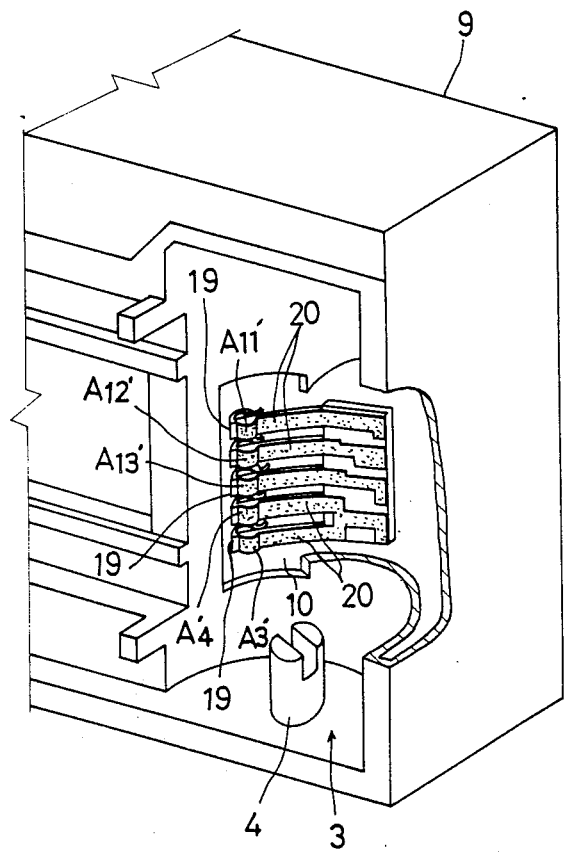
FIG. 11 is a perspective view of a principal portion of a camera according to a still further embodiment of the invention.

FIG. 11 shows a modification of the device of FIG. 9, which includes a further electric contact A11 for contacting the second code area E2 and which is different in the segment construction.

Separate contacts A11, A12' and A13' for contacting the second, third and fourth code areas, respectively, enable an eight-way judgment in a mode similar to the mode of the preceding embodiment. Film sensitivity of cartridge is read to 1 EV.

As seen from FIG. 11, segments 19 of this device extend sideways to be supported at righthand ends in the drawing to avoid a complex construction due to the increase in the number of contacts. Each segment 19 is formed of a resilient non-conductive plastic material. Contacts A11', A12', A13', A2' and A3' are formed by depositing metal films. Instead of the metal film deposition, the contacts may of course be formed by applying metal strips to the segments 19, for example.

Figure 12:
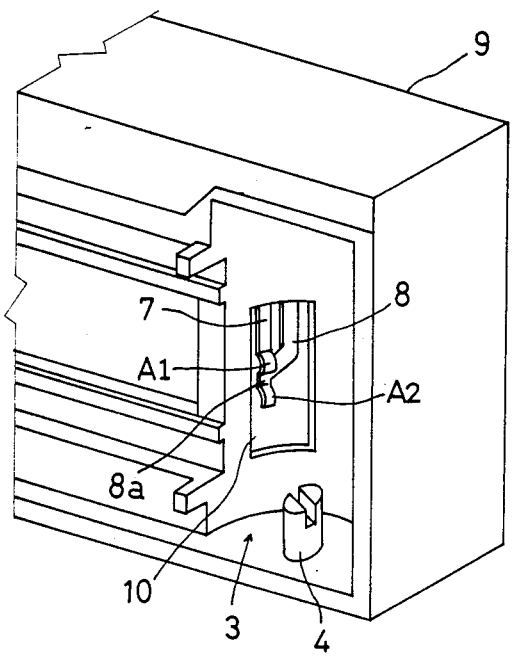
FIG. 12 is a perspective view of a principal portion of a camera according to a still further embodiment of the invention.
Figure 13:
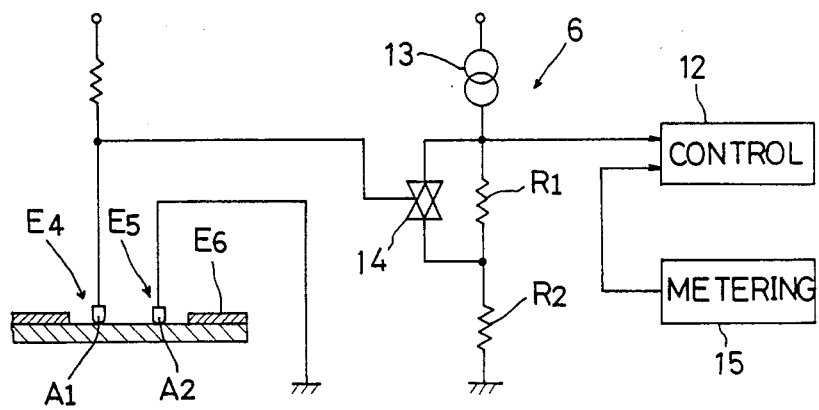
FIG. 13 is a diagram of a circuit included in the camera shown in FIG. 12.

FIGS. 12 and 13 show a further embodiment which dispenses with the third electric contact A3 for contacting the sixth code area E6. The illustrated circuit provides a two-way detection of film sensitivity only through conduction and non-conduction between the first contact A1 for contacting the fourth code area E4 and the second contact A2 for contacting the fifth code area E5. Currently, the films of ISO 100, 200, 400, 1000 and 1600 take almost a 100% market share (its breakdown being 84.1% for ISO 100, 3.8% for ISO 200, 9.7% for ISO 400, 0.1% for ISO 1000, and 2.3% for ISO 1600 according to "Photo Market '86"). Because these films have a relatively large exposure latitude, this device provides a detection scheme using ISO 400 as the demarcation value, and detects ISO 100, 200 and 1000 as ISO 100, and ISO 400 and 1600 as ISO 400. ISO 1000 is detected by this device as ISO 100 which should be detected as ISO 400. The probability of this detection error is 0.1% since ISO 1000 films have a 0.1% market share as noted above. Thus the construction according to this embodiment is adequate for practical purposes. This construction is the same as the preceding constructions in the other aspects, and it is considered sufficient to affix like numerals to like elements without particularly describing such elements.

The several embodiments of the present invention have been described taking the film sensitivity detection for example. However, it will be apparent to those skilled in the art that the present invention is also useful for the detection of all other film information including the number of frames.

What is claimed is:

1. An automatic film information reading method for reading film sensitivity from film information code patterns on a peripheral surface of a film cartridge, the film sensitivity being encoded by arranging at least first through sixth conductive and non-conductive code areas axially on the film cartridge to correspond to film information, said method comprising the steps of:
   causing a first electric contact to contact at least one of a second, a third and a fourth code area counted from an end of said film cartridge from which a film winding shaft projects,
   causing a second electric contact to contact a fifth code area,
   causing a third electric contact in a short-circuiting relationship with said second electric contact to contact a sixth code area,
   detecting conduction and non-conduction states between said first to third electric contacts provided by said film information code patterns, and
   determining said film sensitivity from detection results.

2. An automatic film information reading device for reading film sensitivity from film information code patterns on a peripheral surface of a film cartridge, the film sensitivity being encoded by arranging at least first through sixth conductive and non-conductive code areas axially on the film cartridge to correspond to film information, said device comprising:
   a cartridge chamber for accommodating said film cartridge,
   probe means for contacting said film information code patterns, said probe means including a first electric contact for contacting at least one of a second, a third and a fourth code area counted from an end of said film cartridge from which a film winding shaft projects, a second electric contact for contacting a fifth code area, a third electric contact in a short-circuiting relationship with said second electric contact for contacting a sixth code area, and short-circuit means for electrically short-circuiting said second and third electric contacts, and
   a film information readout circuit connected to said probe means for reading said film sensitivity from conduction and non-conduction states between said first to third electric contacts provided by said film information code patterns.

3. An automatic film information reading device as claimed in claim 2, wherein said film information readout circuit reads said film information by providing said second code area with a weight corresponding to 1 EV, said third code area with a weight corresponding to 2 EV, said fourth code area with a weight corresponding to 4 EV, said fifth code area with a weight corresponding to $\frac{1}{2}$ EV, and said sixth code area with a weight corresponding to $\frac{2}{3}$ EV wherein EV constitutes an APEX system value.

4. An automatic film information reading device as claimed in claim 2 or 3, wherein said short-circuit means comprises a bifurcated segment formed of a resilient material, said second electric contact being defined by one leg of said bifurcated segment, and said third electric contact being defined by another leg thereof.

5. An automatic film information reading device as claimed in claim 4, wherein said bifurcated segment has said legs disposed adjacent a rewinding shaft provided for engaging an end of said film winding shaft against rotation, and is fixed at an end remote from said rewinding shaft.

6. An automatic film information reading device as claimed in claim 5, wherein said first electronic contact is defined by a free end of a further segment formed of a resilient material, said further segment being fixed at another end thereof, with the free end being disposed adjacent said rewinding shaft and movable radially of said cartridge chamber, said free end projecting into said cartridge chamber to contact said peripheral surface of said film cartridge mounted in said cartridge chamber.

7. An automatic film information reading device as claimed in claim 2, wherein said first electric contact is disposed to contact said third code area.

8. An automatic film information reading device as claimed in claim 2, wherein said first electric contact is disposed to contact said fourth code area.

9. An automatic film information reading device as claimed in claim 2, wherein said first electric contact is disposed to contact said third and fourth code areas.

10. An automatic film information reading device as claimed in claim 2, wherein said first electric contact is disposed to contact said second, third and fourth code areas.

11. An automatic film information reading device as claimed in claim 2, wherein said probe means comprises a plurality of segments formed of a non-conductive, resilient plastic material, said electric contacts being formed by depositing metal films on said segments.

12. An automatic film information reading device for reading film sensitivity from film information code patterns on a peripheral surface of a film cartridge, the film sensitivity being encoded by arranging conducting areas and non-conductive areas axially on the film cartridge to correspond to film information, said device comprising:

a cartridge chamber for accommodating said film cartridge, probe means for contacting said film information code patterns and having a plurality of electric contacts for contacting said film information code patterns, said probe means including a plurality of segments formed of a resilient material, each of said segments arranged to be approximately along the axis of said cartridge when loaded in the cartridge chamber, with one end of each segment being fixed and another free end being disposed relatively adjacent to a rewinding shaft provided in said cartridge chamber, and movable radially of said cartridge chamber, said free end projecting into said cartridge chamber to contact said peripheral surface of said film cartridge mounted in said cartridge chamber, said electric contacts being formed on said free ends, and a film information readout circuit connected to said probe means for reading said film sensitivity from conduction and non-conduction states between said electric contacts provided by said film information code patterns.

13. An automatic film information reading device as claimed in claim 12, wherein said segments are conductive and said electric contacts are defined by said free ends per se of said segments.

14. An automatic film information reading device as claimed in claim 12, wherein said segments are non-conductive synthetic resin elements and said electric contacts are formed by depositing metal films on said segments.

15. An automatic film information reading device for reading film sensitivity from film information code patterns on a peripheral surface of a film cartridge, the film sensitivity being encoded by arranging conductive areas and non-conductive areas axially on the film cartridge to correspond to film information, said device comprising:

a cartridge chamber for accommodating said film cartridge;

probe means for contacting said film information code patterns, said probe means including only two contacts, said two contacts consisting of a first electric contact for contacting a fourth code area counted from an end of said film cartridge from which a film winding shaft projects, and a second electric contact for contacting a fifth code area; and a film information readout circuit connected to said probe means for reading said film sensitivity from conduction and non-conduction states between said first and second electric contacts provided by said film information code patterns.

* * * * *